Jan. 16, 1940.  F. LAESSKER  2,187,544
DIVIDING APPARATUS FOR TOOTHED WHEELS OR LIKE GRINDING MACHINES
Filed Sept. 15, 1937  2 Sheets-Sheet 2

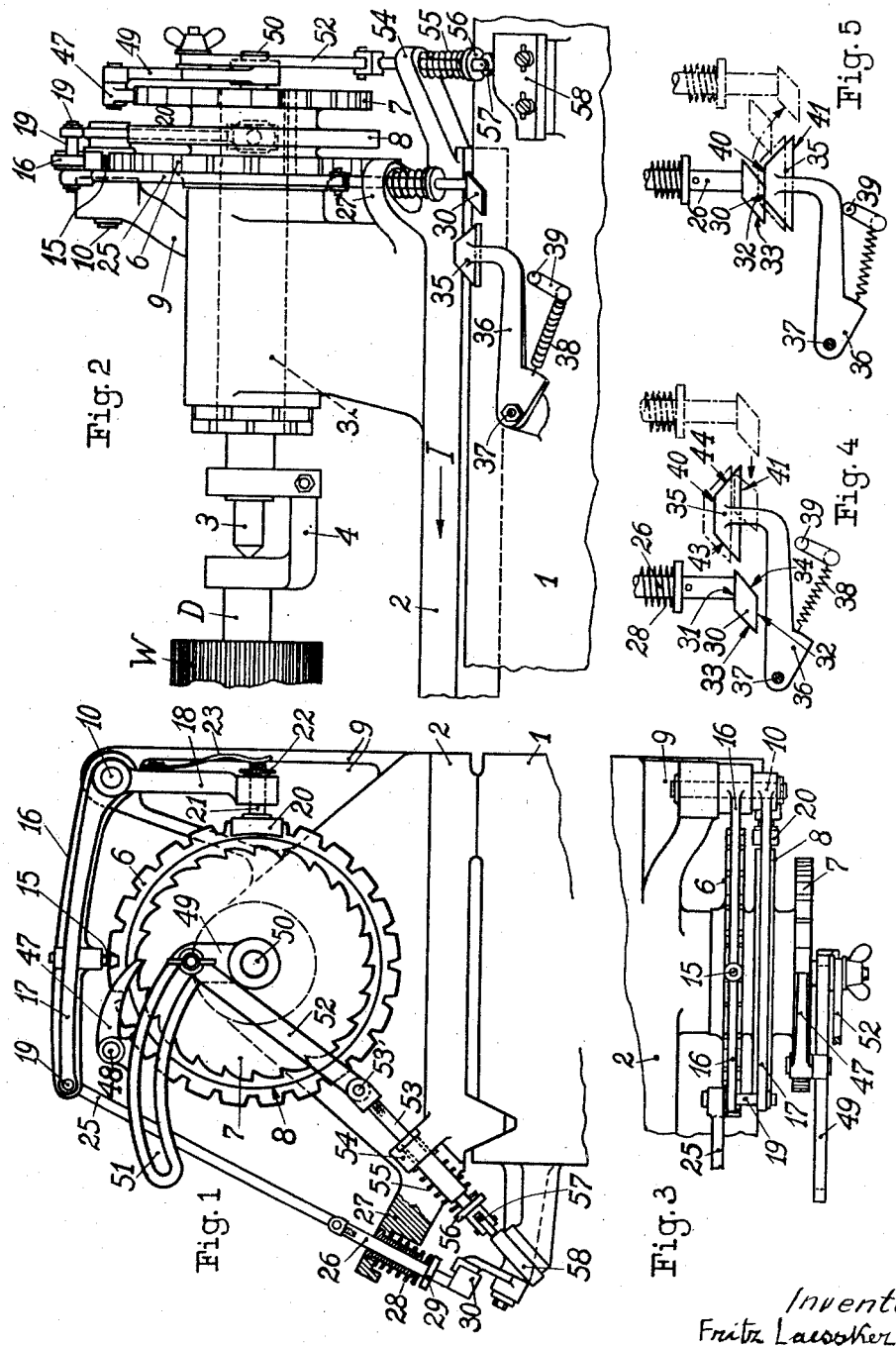

Inventor:
Fritz Laessker
by S. Sokal.
Attorney.

Patented Jan. 16, 1940

2,187,544

UNITED STATES PATENT OFFICE 2,187,544

DIVIDING APPARATUS FOR TOOTHED WHEELS OR LIKE GRINDING MACHINES

Fritz Laessker, Friedrichshafen-on-the-Bodensee, Germany, assignor to Zahnradfabrik Friedrichshafen Aktiengesellschaft, Friedrichshafen-on-the-Bodensee, Germany Application September 15, 1937, Serial No. 163,930
In Germany September 25, 1936

11 Claims. (Cl. 51—216)

This invention relates to grinding machines for grinding toothed wheels, grooved shafts or the like having straight teeth parallel to the axes thereof, and particularly to dividing apparatus therefor employing a dividing disc or plate provided with notches corresponding to the number of tooth spaces or grooves of the workpiece, and an engageable and disengageable index bolt or stop as well as a control device for the dividing plate. The object of the invention is to provide an increased accuracy of division and a simple and certain adjustment to the necessary dividing angle.

Another object is to enable the dividing apparatus to be operated in a noiseless and shock-free manner.

The drive of the control device for the dividing plate is, in accordance with the invention, for the grinding of straight running teeth, derived from the reciprocatory movement of the head stock slide carrying the workpiece in centres and arranged on the machine bedplate.

In the dividing apparatus hitherto known, the dividing plate is secured against undesirable rotations, which can set in when the index bolt or stop is released from the dividing plate, by a brake acting continuously on its axis. This brake thus acts even when the stop engages the guide plate for its final adjustment. As a consequence, the friction produced by the brake prejudices the accurate adjustment of the dividing plate.

The invention differs from the above hitherto known dividing mechanisms by the following advantageous characteristics.

The dividing plate is secured by a friction brake against undesired rotation only whilst the index bolt or stop is released from the dividing plate. The adjustment of the dividing plate by the stop thus takes place with the said plate having complete freedom of rotation, an increased accuracy of operation being thereby obtained. This result is attained in that the stop and the brake are alternate in their effect or action on the dividing plate or the shaft thereof. The operation of the brake is advantageously a result of the movement of the stop. The index stop and the brake are arranged on the arms of a two-armed lever, the bearing for the brake being, however, separated from that of the stop in order to prevent the brake pressures from being imparted to the sensitive stop bearing.

In this way, by reason of the aforesaid reciprocal action between the stop and the brake device, the braking effect is only removed when the stop has already partly entered a groove or notch in the dividing plate.

The index bolt or stop controlled from a reciprocating part of the machine directly by a cam member, is constantly guided, not only during its releasing movement, but also during its engaging movement, whilst in known dividing apparatus, a rapid and frequently blow-like falling of the stop into the dividing plate takes place. By means of the invention, however, a quiet working between the stop and the groove of the dividing plate is produced which is entirely free from wear and the stop, as well as the bearing of the dividing shaft, is not subjected to shocks. In order to make the time period during which the dividing plate is prevented by the brake from undesired rotation as short as possible, the stop engages the dividing plate immediately after a dividing operation has been effected. The control of the stop is, however, derived from a reciprocatory movement of a machine part. Thus, in accordance with the invention, a control mechanism is provided for this stop which is effected either only during the forward movement or only during the backward movement of the machine part in question.

The amount of movement or the throw of the dividing plate effected by the dividing apparatus is made to conform to the dividing angle required at the time by variation of only a single adjusting dimension. This is made possible by the use, for example, of a lever driving through a control pawl on a forward feeding disc or plate, which lever is moved by means of a cam. The adjustment of the stroke of the lever with respect to the stroke of the cam, is effected by a link controlling the lever, which link is displaceable with its connecting head in an arcuate slot formed in the said lever. This single adjustment is sufficient to allow the stop to engage the groove of the dividing plate in all the dividing angular adjustments.

Further characteristics of the invention will appear from the following description.

In order that the invention may be fully understood, I will now describe some embodiments thereof by way of example, by reference to the accompanying drawings, in which Figs. 1–3 show one embodiment, Fig. 1 being a front elevation of the dividing apparatus, Fig. 2 a side view thereof, and Fig. 3 a plan view.

Figs. 4 and 5 illustrate the different working positions of the means for operating the stop and the brake.

Figures 6, 7, 8:
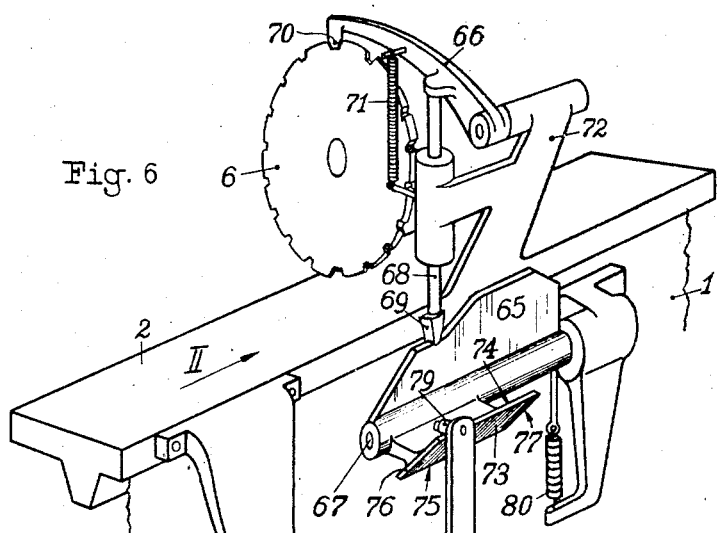
Fig. 6 shows a further construction of means for operating the stop.
Fig. 7 is a detail view of part of Fig. 6.
Fig. 8 is a side view of Fig. 6.

In the grinding machine bedplate 1 is carried in the usual way the slide table 2 carrying the workpiece W between centres. One centre shaft 3, which engages the workpiece mandrel D by means of a carrier member 4, carries the dividing apparatus. On the shaft 3 are carried as a unit the dividing disc or plate 6, the feed disc 7 and a brake disc 8. In an arm 9 projecting upwardly from the slide table 2, is mounted the pivot pin 10 on which is swingably carried the lever 16 carrying an index bolt or stop 15 and the brake lever formed of two arms 17 and 18. The stop lever 16 and one arm 17 of the brake lever, are connected at their free ends by a pin 19. The two levers thus form a single unit and only their hubs on the pivot pin 10 are separated from one another so that the stop lever 16 is not influenced by the brake pressures set up at any time. In the arm 18 of the brake lever is arranged the brake shoe 20 carrying a pin 21 and, for example, so limited by a screwed-on disc 22 that in the rest position of the brake lever and indeed during the engagement of the stop 15 with the dividing plate 6, the brake shoe 20 cannot contact with the brake disc 8. A spring 23 holds the brake shoe in this position.

A link member 25 engages the pin 19 and is connected at its other end pivotally to a shaft 26 which is guided in a projection 27 of the aforesaid slide table 2. A compression spring 28 which bears at one end on the stationary part 27, and acts at the other end against a disc 29 fixed on the shaft 26, holds the stop 15 in engagement with the dividing plate 6.

At its lower end, the shaft 26 is provided with a head 30 which is formed with two superimposed parallel guide surfaces 31 and 32 and is parallelly inclined at its side faces 33 and 34. By means of this specially shaped head 30, the control of the lever 16 and the lever 17, 18 is effected in such manner that in one direction of movement of the slide table, a constant up-and-down movement of the rod 25 takes place and, in the other direction of movement of the table, the rod 25 is uninfluenced. This is effected by co-operation of the head 30 with a guide member 35 arranged within the range of the head 30 on the stationary support 1 of the grinding machine. The guide piece 35 forms the end of a carrying arm 36 which can pivot around the stationary pin 37 and is maintained in a position of rest by means of a spring 38. The movement of the carrying arm 36 is limited in the downward direction by a stop 39. The guide piece 35 is formed with two superimposed guide faces 40 and 41 which are parallel to the guide faces 31 and 32 of the head 30 of the shaft 26. The guide 35 is also formed with bevel side faces 43 and 44 extending in opposite directions to one another.

For the purpose of feeding the dividing plate 6 and the workpiece W connected to it, there is provided a control device which acts on the feeding disc 7 divided correspondingly to the dividing disc 6. A control pawl 47 engages in the feeding disc 7 which pawl can pivot around a pin 48 arranged on the lever 49. The lever 49 is rotatably mounted on a pin 50 arranged centrally of the centre shaft 3 and is formed with an arcuate slot 51. Within this slot one end of an arm 52 is fixable to the lever 49, whilst the other end of the arm 52 is connected to a shaft 53 itself guided in a bearing arm 54 fixed to the slide table 2. The length of the arm 52 corresponds to the radius of the arcuate slot and the position of the pivot pin 53' corresponds to the centre of the arc. A compression spring 55, which bears against the lever arm 54 and acts against a disc 56 fixed on the shaft, tends to force the shaft 53 with its roller 57 carried at the lower end thereof against a guide cam 58 secured to the stationary support of the grinding machine. By means of this arrangement of the link arm 52 in the slot 51, the adjustment of the apparatus to different dividing angles is made possible, but the end position of the control pawl 47 remains the same in all dividing angle adjustments.

For operating the dividing apparatus illustrated in Figs. 1–3, by the cam 58, the longitudinal displacement of the slide table 2 is employed.

When the individual parts occupy the position shown in Fig. 2, the stop 15 is in engagement with the dividing plate 6 and the brake shoe 20 is released from the brake disc 8.

If the table 2 is displaced in the direction of the arrow 1 in Fig. 2, then the roller 57, carried on the end of the shaft 53, commences to slide from the highest position of the guide cam 58 so that the control pawl 47 is displaced from its end position in engagement with the feeding disc 7. At the same time, the head 30 carried by the shaft 26 carries out the movement shown in Fig. 4. The inclined face 33 of the said head 30 strikes the guide piece 35, raises it against the action of the spring as shown in broken lines and slides with its upper surface 31 along the under surface of the said guide 35. As soon as the head 30 leaves the guide piece 35, the latter moves down again. A lower position of the head 30 is shown in full lines in Fig. 4 and an intermediate position in broken lines.

The movement of the slide 30 in the opposite direction is illustrated in Fig. 5. This is the movement during which the stop 15 is withdrawn from the dividing plate 6, the feeding of the dividing plate or the workpiece W is effected and during which from the time of the disengagement of the stop from the groove of the dividing plate, until re-engagement thereof, the dividing plate or the workpiece is braked against undesired rotation. When the head 30 of the shaft 26 is moved to the right from the position indicated in full lines in Fig. 4 so that the bevel face 34 thereof contacts with the bevel face 43 of the guide piece 35, the arm 36 is forced downwardly into the position limited by the stop 39 whereupon the head 30 slides, with the spring 28 compressed, on the upper surface 40 of the guide piece 35. The head 30 is shown in such a position in full lines in Fig. 5. As long as the head 30 slides on the upper face 40, the stop 15 is withdrawn from engagement with the dividing plate 6 and with the gradual sliding of the head 30 on the bevel face 44 of the guide piece 35, the stop 15 returns into engagement with the dividing plate 6 in that groove which is brought into position thereunder after the feed motion of the plate 6 has been effected by the pawl 47. As soon as the head 30 reaches the lowermost position indicated in broken lines in Fig. 5 and which is also shown in Fig. 2, the carrying arm 36, with the guide piece 35, returns into the neutral position of rest.

As soon as the stop 15 has been guided into the groove of the dividing plate, the brake shoe 20 is removed from the brake disc 8 so that the final adjustment of the dividing plate 6 can be effected by the stop 15 with complete freedom of rotation of the dividing plate. The stop thus, for the accurate adjustment of the dividing plate, does not have to overcome any frictional forces and can thus engage the dividing plate slowly whilst being constantly guided in its movement. During continuous operation, a quiet working of the stop, which is also free from wear, is effected, and the dividing plate and the bearing for the stop, as well as the bearing for the shaft of the dividing plate, remain free from shocks and thus retain their accuracy.

In accordance with the invention, the individual parts are so relatively dimensioned that the time during which the dividing plate is prevented by the brake device from undesired rotation, is as short as possible and for this purpose, the stop re-engages the dividing plate immediately after the dividing operation has been effected.

It is also preferable that, in accordance with the invention, the feed motion of the pawl 47 be made to conform, by only a single adjustment, to the size of the dividing angle by means such as the aforesaid lever 49 formed with the arcuate slot 51. The arcuate shape of the slot, and the length of the link arm 52, which is equal to the radius of the arc, ensure that, with the different amounts of movement of the lever 49, corresponding to the different dividing angles, the initial or end positions of the control pawl 47 agree with the position of the stop 15, that is to say, the control pawl 47 will, for example, in its initial position always be in the same radial plane as the stop 15, as shown in Figure 1. Consequently, the stop engages the groove of the dividing plate invariable with all dividing angle adjustments and without any subsequent correction being necessary.

The modified arrangement for operating the stop shown in Figs. 6-8 consists essentially of a cam 65 provided on the base or support 1 of the grinding machine, which cam is swingably supported on a pin 67 extending parallel to the slide table 2. The cam engages the vertical bolt 68 which is provided at its lower end with, for example, a rounded cutting or knife 69 or with a roller. On the upper end of the bolt 68 rests the lever 66 carrying the stop 70 through the action of a tension spring 71. The lever 66 is mounted on a frame 72 of the table 2, in which is also guided the aforesaid bolt 68. Laterally of the cam 65 is disposed a guiding cam 73, the upper and under longitudinal edges 74 and 75 of which are parallel to the slide table 2, whilst the front and rear edges 76 and 77 are inclined. Laterally of the slide table 2 extends an arm 78 which carries a bolt 79 or a rotatable roller. This bolt or pin 79 swings, on the movement of the table 2 in the direction of the arrow II shown in Fig. 6, the cam 65 into the working position in order to lift, through the bolt 68 and the lever 66, the stop out of the dividing plate 6 and to lower it into engagement therewith again. The cam 65 engages at the lower part thereof a tension spring 80 in such a direction that the former is maintained in an intermediate position (Fig. 7). From this intermediate position, the cam 65 is, on the movement of the table in one direction, swung into the operating position and on the movement of the table in the other direction, swung out of action. The stop is thus constantly guided both on its disengaging and also during its engaging movement.

On the return of the slide table 2, the pin 79 slides on the bevel face 77 of the guide downwardly on to the under edge 75 of the guide 73 and swings the cam 65 into the position shown in broken lines in Fig. 8 out of contact with the vertical bolt 68 so that, during this return movement, the stop 70 is not effected by the cam 65.

I claim:

1. In a grinding machine of the type referred for the grinding of straight teeth and having a movable slide table, a dividing apparatus comprising the subcombination of: a rotatable dividing plate mounted on said slide table, said plate having notches therearound corresponding to the tooth spaces of a gear to be ground; a movable stop associated with said plate; a brake device also associated with said plate and operatively connected to said stop; a cam mounted on a stationary part of the grinding machine; link mechanism connected to said stop and to said brake device and operable by said cam on movement of the slide table to engage and disengage said stop, whereby when said stop is disengaged said brake is engaged and when said stop is engaged said brake is released.

2. In a dividing apparatus for a grinding machine of the type referred to, for grinding straight teeth, the combination of: a support; a rotatable dividing plate mounted in said support, and said plate having notches therearound corresponding to the tooth spaces of a gear to be ground; a pin mounted in said support; an arm pivoted at one end to said pin; a stop carried by said arm, said stop being operatively associated with said dividing plate; a two-armed lever also pivoted to said pin independently of said arm; a brake device carried by one arm of said lever and the other arm of said lever being connected at its free end to said first mentioned arm carrying said stop; a common operating lever connected to said first mentioned arm and to said stop and brake actuating lever; and means for actuating said lever to control said stop and said brake device, the arrangement being such that when said stop is disengaged said brake device is engaged and when said stop is engaged said brake device is released.

3. In a grinding machine of the type referred to for grinding straight teeth and having a slide table, a dividing apparatus, said apparatus comprising the subcombination of: a rotatable dividing plate mounted on said slide table, said plate having notches therearound corresponding to the tooth spaces of a gear to be ground; means carried by said slide table for rotating said plate; a cam mounted on a stationary machine part for actuating said rotating means on movement of said slide table; a movable stop associated with said plate; means actuated on movement of said slide table for moving said stop into and out of engagement with said plate; and a brake device for said plate operable on disengagement of said stop, the arrangement being such that, when said stop is disengaged, said brake device is engaged and, when said stop is engaged, said brake device is released.

4. In a dividing apparatus for a grinding machine of the type referred to for grinding straight teeth, the subcombination of: a rotatable dividing plate having notches therearound corresponding to the tooth spaces of a gear to be ground; a movable stop associated with said plate; means operable from a moving part of said grinding machine for moving said stop successively into and out of engagement with said plate, when said part is moved in one direction; and means for preventing actuation of said moving means on displacement of said part in the opposite direction; and a brake device for said plate operable on disengagement of said stop.

5. In a grinding machine of the type referred to for grinding straight teeth, a dividing apparatus, said apparatus comprising the subcombination of: a rotatable dividing plate mounted on a movable part of the grinding machine, said plate having notches therearound corresponding to the tooth spaces of a gear to be ground; a movable stop associated with said plate; means for moving said stop into and out of engagement with said dividing plate; a cam mounted on a stationary part of said grinding machine for actuating said moving means when said movable machine part is moved in one direction; means for preventing actuation of said moving means on movement of said machine part in the opposite direction; and a brake device for said plate operable on disengagement of said stop, the arrangement being such that, when said stop is disengaged from said plate, said brake is engaged, and when said stop is engaged, said brake is released.

6. In a dividing apparatus for a grinding machine of the type referred to for grinding straight teeth, the subcombination of: a dividing plate carried by a moveable part of said machine, said plate having notches therearound corresponding to the tooth spaces of a gear to be ground; a movable stop associated with said plate; a brake device for said plate operatively associated with said stop in such manner that when said stop is in its operative position, said brake device is inoperative; link mechanism connected to said stop and to said brake device, said mechanism having cam surfaces thereon; a movable cam pivoted to a stationary part of said machine so as to turn about an axis at right angles to its plane, said cam having bevelled surfaces thereon co-operating with said first mentioned cam surfaces, such that said link mechanism is actuated by said cam to operate said stop and said brake only when said movable part of the grinding machine is moved in one direction.

7. In a dividing apparatus for a grinding machine of the type referred to for grinding straight teeth, the combination of: a movable support; a rotatable dividing plate mounted in said support, said plate having notches therearound corresponding to the tooth spaces of a gear to be ground; means for rotating said plate; said means comprising a ratchet disc concentric with said plate; a pawl co-operating with said ratchet disc and a cam-actuated lever associated with said pawl for actuating said pawl; a movable stop associated with said plate; means for moving said stop into and out of engagement with said plate; and a brake device for said plate operable on disengagement of said stop, the arrangement being such that, when said stop is disengaged from said plate, said brake device is engaged thereto and, when said stop engages said plate, said brake is released.

8. In a dividing apparatus for a grinding machine of the type referred to; for grinding straight teeth, the subcombination of: a rotatable dividing plate carried by a moving part of the machine and said plate having notches therearound corresponding to the tooth spaces of a gear to be ground; a movable stop associated with said plate; a brake device for said plate operatively associated with said stop; means for moving said stop and said brake device; a cam carried by a stationary part of said machine; a ratchet disc concentric with and connected to said plate; an arm pivotally carried by said disc said arm having an arcuate slot therein; an operating lever slidably engaging at one end thereof in said slot; and means for fixing said lever in any desired position in said slot to vary the throw of said lever in accordance with the desired dividing angle, and said lever being spring-urged into engagement with said cam whereby, on movement of said movable machine part, in one direction, said lever is actuated to move said pawl around said ratchet disc and, on movement of said part in the opposite direction, said lever is actuated to cause said pawl to move said ratchet disc and thereby rotate said dividing plate.

9. In a dividing apparatus for a grinding machine of the type referred to for grinding straight teeth, the subcombination of: a rotatable dividing plate carried by a moving part of the machine, said plate having notches therearound corresponding to the tooth spaces of a gear to be ground; a stop lever pivoted to said moving machine part; a stop carried by said lever; a cam pivoted to a stationary part of said machine so as to turn about an axis lying in the plane of said cam; a spring associated with said cam adapted normally to hold said cam in its operative position; a movable rod carried by said part and engaging said cam in one position thereof; a spring connected to said stop lever and said moving machine part tending to maintain said stop lever in contact with said movable rod; an extension on said cam, said extension having bevelled side faces; and a pin carried by said moving machine part and co-operating with said extension, whereby, on movement of said moving machine part in one direction, said pin rides over said bevelled extension faces and said cam is maintained in its operative position by said spring so as to move said stop out of and into engagement with said plate, but, on movement of said machine part in the opposite direction, said pin swings said cam out of its operative position against the action of said spring, and said stop is not actuated thereby.

10. In a dividing apparatus for a grinding machine of the type referred to for grinding straight teeth, the subcombination of: a rotatable dividing plate carried by a moving part of the machine and said plate having notches therearound corresponding to the tooth spaces of a gear to be ground; a movable stop associated with said plate; a brake device for said plate operatively associated with said stop; means for moving said stop and said brake device; a cam carried by a stationary part of said machine; a ratchet disc concentric with and connected to said plate; an arm pivotally carried by said disc said arm having an arcuate slot therein; an operating lever slidably engaging at one end thereof in said slot; and means for fixing said lever in any desired position in said slot to vary the throw of said lever in accordance with the desired dividing angle, and said lever being spring-urged into engagement with said cam whereby, on movement of said movable machine part in one direction, said lever is actuated to move said pawl around said ratchet disc and, on movement of said part in the opposite direction, said lever is actuated to cause said pawl to move said ratchet disc and thereby rotate said dividing plate, and the final rest position of said pawl with respect to said stop remaining constant irrespective of the particular adjusted dividing angle.

11. In a dividing apparatus for a grinding machine of the type referred to, the combination of: a rotatable dividing plate; a pivoted bell-crank lever; a stop for engagement with, and disengagement from, said plate connected to one arm of said lever; a brake carried by the other arm of said lever so as to be engaged with, and disengaged from, said plate; means for pivoting said first-mentioned arm to engage and disengage said stop, whereby said brake-carrying-arm is automatically also pivoted to disengage and engage said brake in alternation with said stop.

FRITZ LAESSKER.